Patented Sept. 27, 1938

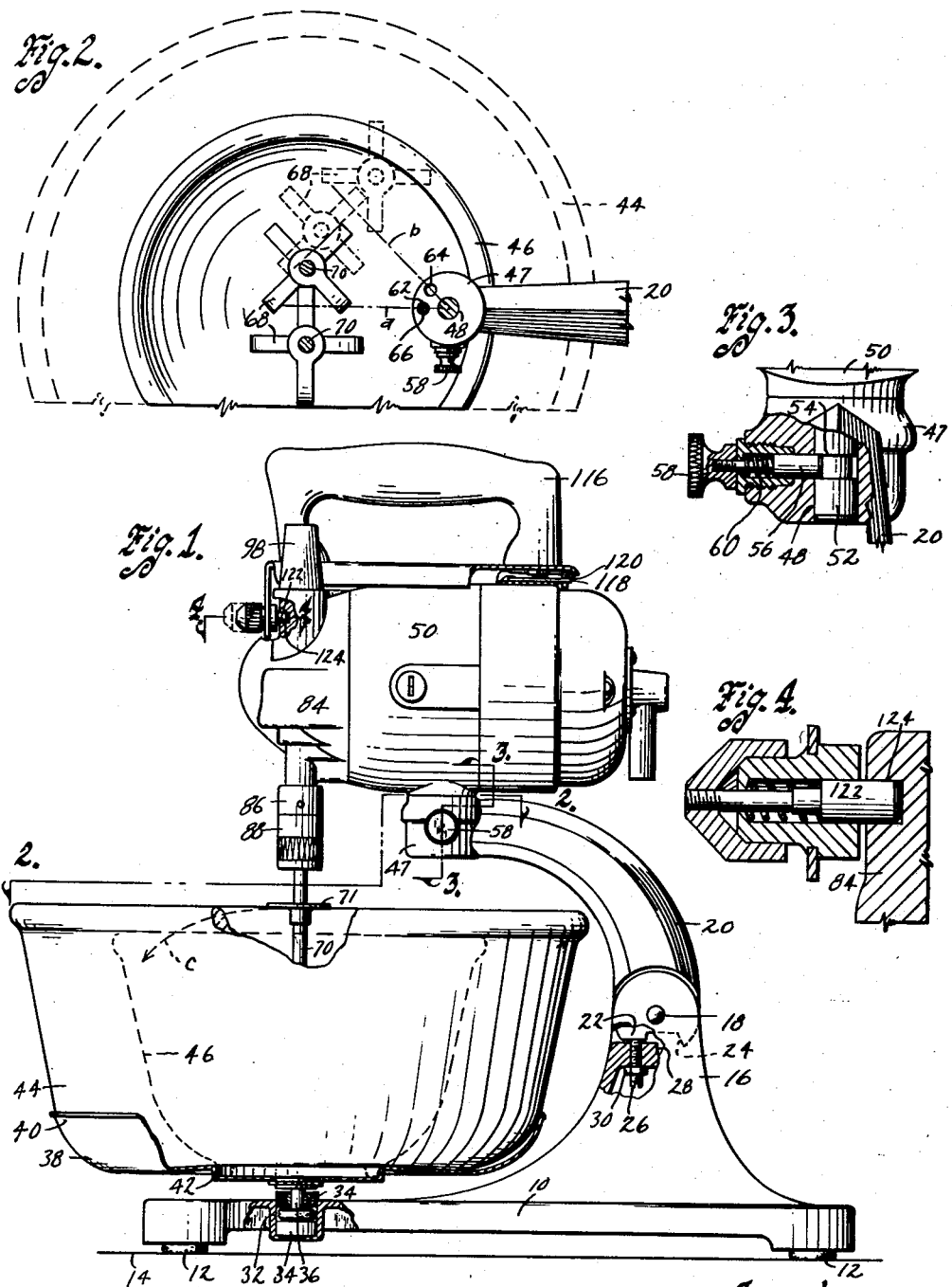

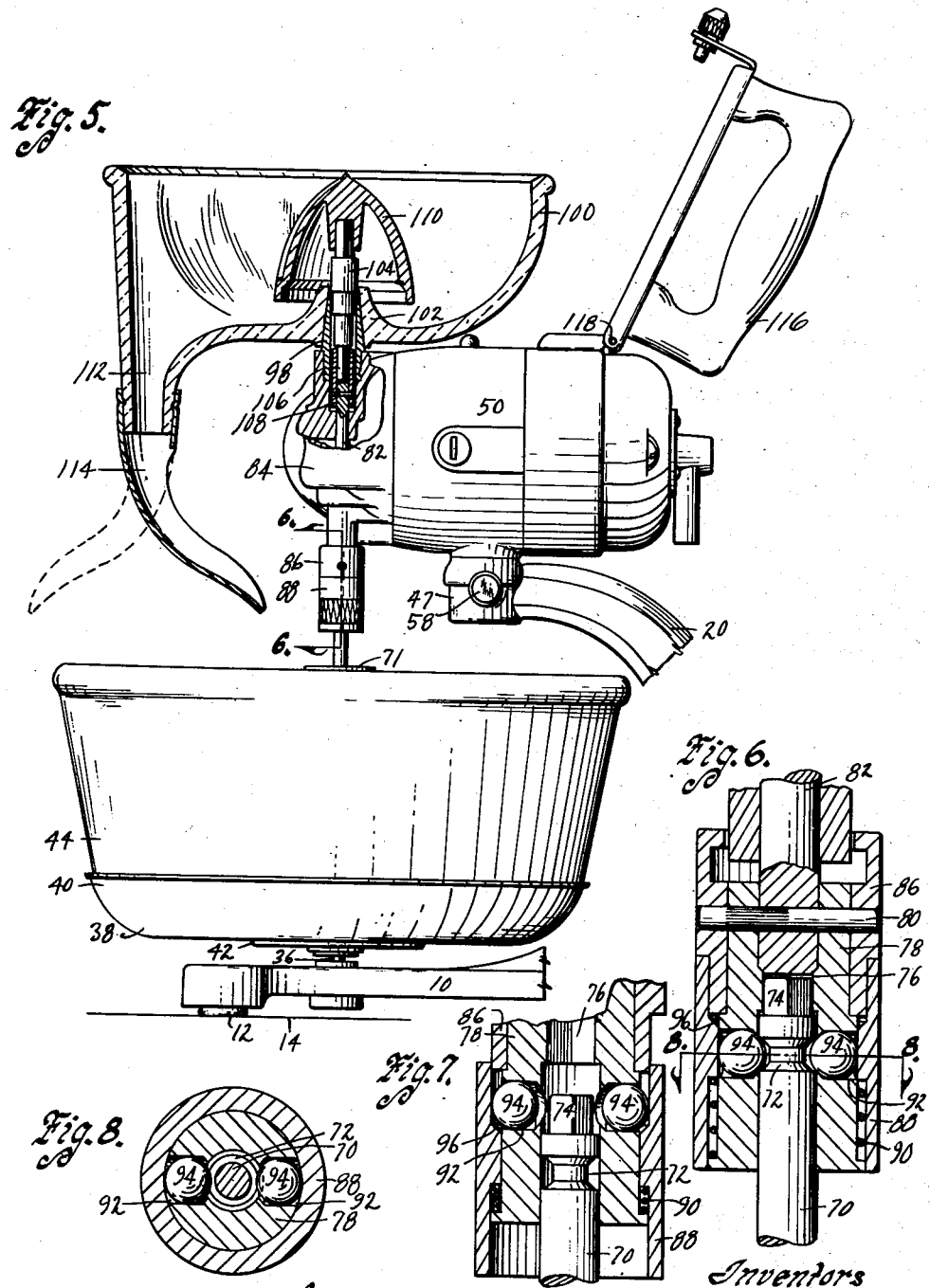

2,131,290

UNITED STATES PATENT OFFICE 2,131,290

FOOD MIXER AND FRUIT JUICE EXTRACTOR

William B. Kochner and Eugene Newnham, St. Louis, Mo., assignors to Knapp-Monarch Company, St. Louis, Mo., a corporation of Missouri Application May 21, 1935, Serial No. 22,569

5 Claims. (Cl 259—84)

An object of our invention is to provide an electric appliance especially adaptable for both mixing food and juicing fruit, the same being comparatively simple, durable and inexpensive.

A further object is to provide a combined food mixer and fruit juice extractor in which different sized bowls are adapted to be supported rotatably by a bowl support, a mixer element being provided for cooperation with the contents of either bowl and being so mounted that it can properly coact with either a large or a small bowl by a simple pivotal adjustment.

A further object is to provide a food mixer having a removable motor, the mounting for the motor including a latch and being so arranged that the motor can be mounted in a plurality of different angular positions to cause the proper association of a mixer element, depending from the motor with different sizes of mixing bowls supported on the bowl support of the mixer.

Still a further object is to provide an upstanding hub on the motor with which the fruit juicer mechanism is associable, a handle being provided for manipulation of the motor by hand when desired instead of it being mounted on the base, and this handle being pivoted so as to swing out of the way when it is desired to place the juicer mechanism in operation.

Still a further object is to provide a novel clutch arrangement between a mixer element and a driven shaft, which is readily operable for disconnecting the mixer element when it is desired to clean it or remove it, when it is not being used.

With these and other objects in view, our invention consists in the construction, arrangement and combination of the various parts of our fruit mixer and fruit juice extractor, whereby the objects contemplated are attained, as hereinafter more fully set forth, pointed out in our claims, and illustrated in the accompanying drawings, in which:

Figure 1 is a side elevation of a food mixer and fruit juice extractor embodying our invention, parts being broken away and other parts being shown in section to illustrate details of construction.

Figure 2 is a partial plan view of the same, illustrating an adjustment feature for the mixer element.

Figure 3 is an enlarged, detail, sectional view on the line 3—3 of Figure 1, showing a motor latching means.

Figure 4 is an enlarged, detail sectional view on the line 4—4 of Figure 1, showing a handle latching means.

Figure 5 is a side elevation, partly in section showing the mixer set up for juicing fruit.

Figures 6 and 7 are enlarged, detail, sectional views on the lines 6—6 of Figure 5, showing a clutch arrangement between a mixer element and the motor driven shaft in connected and disconnected positions respectively; and Figure 8 is a sectional view on the line 8—8 of Figure 6, showing further details of the clutch.

On the accompanying drawings, we have used the reference numeral 10 to indicate a base. It is preferably provided with resilient pads or feet 12 for engagement with a supporting surface 14, such as a table or the like.

Upstanding on the base 10 is a bifurcated post 16. Pivoted in the bifurcation of the post 16 on a pin 18 is a motor supporting arm 20. It is provided with a pair of stop shoulders 22 and 24 adapted to coact with a set screw 26 and a shoulder 28 respectively in the lowered and raised positions of the arm 20. The set screw 26 is provided with a lock nut 30 and the purpose of the set screw is to adjust the mixer so that a mixer element thereof will be adjacent, but not touch the bottom of a mixing bowl, as will be observed after the entire invention is described.

In the base 10, we provide a socket 32 adapted to removably receive a pair of ball bearings 34, which are pressed or otherwise secured on a spindle 36. The spindle 36 is secured to a pan-like support 38 having a peripheral flange 40 and a smaller offset flange 42. The flange 40 is adapted to position a large mixing bowl 44 while the flange 42 is adapted to position a smaller one 46, each concentrically relative to the axis of the spindle 36.

The arm 20 overhangs the bowl supporting pin 38 and its free end is provided with a hub 47, having a socket 48 (see Figure 3).

A motor 50 is provided with a pin 52 adapted to pivotally enter the socket 48. The pin 52 is provided with an annular shoulder 54. A latch pin 56 is adapted to coact therewith. The latch pin 56 is provided with a retracting knob 58 and is urged toward the latched position by a spring 60.

The hub 47 is provided with a pair of sockets 62 and 64. These are adapted to selectively receive a pin 66, which depends from the motor 50, so that mixer elements 68, which depend from the motor can be positioned on either of the center lines a, or b, in Figure 2, the mixer elements being shown solid and dotted respectively for the two positions.

In one position the mixer elements are centrally located relative to the small bowl 46, while in another position they are located off-center relative to the large bowl 44, so as to cooperate with its entire contents as the bowl rotates during the mixing operation.

The mixer elements 68 are of the usual overlapping loop type, and are supported by shafts 70. Each shaft 70 at its upper end has an annular groove 72 and an angular portion 74. The angular portion is adapted to enter a similarly shaped angular socket 76 in a sleeve 78. (See Figure 6.) The sleeve 78 is connected as by a pin 80 to a shaft 82, which is suitably geared within a gear housing 84 to the shaft of the motor 50. A second sleeve 86 surrounds the sleeve 78 and slidable on this sleeve is a third one 88. The sleeve 88 is constrained to move in one direction relative to the sleeve 78 by a spring 90 interposed between shoulders of the two sleeves, as clearly shown in Figure 6. The sleeve 78 carries in lateral bores 92 a pair of balls 94, which are urged inwardly to engage the groove 72 by an inclined shoulder 96 on the sleeve 88.

The motor 50 is provided with an upstanding hub 98, which is preferably tapered.

A juicer bowl 100 is provided with a hub 102 for removable positioning on the hub 98.

Within the hub a juicer shaft 104 is rotatably mounted and operatively connected as by an angular portion 106 with a socket member 108 secured to one of the shafts 82. The other shaft need not be provided with a hub 98.

A fruit reamer 110 is mounted on the upper end of the juicer shaft 104 within the bowl 100.

The juicer bowl is provided with a depending spout 112 having an extension spout 114. The spout 114 is rotatable relative to the spout 112, so that the juice extracted from the fruit can be directed to flow either into the mixer bowl or into a receptacle at the side thereof.

A handle 116 is pivoted on a pin 118 supported by the motor 50. A spring 120 is arranged in the pivotal connection to prevent rattling of the parts and to cause the handle to assume the position of Figure 1 under tension, when it is desired to have the handle in an out of the way position for the juicer bowl 100.

A latch shown in Figure 4 is provided for the free end of the handle 116 and comprises a spring-urged retractible pin 122 adapted to normally coact with a socket 124 in the gear housing 84.

*Practical operation*

In the operation of my food mixer and fruit juice extractor, when it is desirable to whip cream or mix foods in the small bowl 46, it is positioned within the flange 42 as shown by dotted lines in Figure 1 and full lines in Figure 2. The mixer elements 68 are centrally positioned as illustrated by full lines in Figure 2, one of them being removed if desirable for the particular food being mixed.

When it is necessary to use the larger bowl 44, it is positioned in the supporting pan 38, and the mixer elements preferably adjusted to the dotted position of Figure 2.

For this adjustment, the knob 58 of the latch pin 56 is pulled outwardly and the motor is lifted by the handle 116 and swung until the pin 66 registers with the socket 64 and then pushed downwardly until again latched.

When it is desirable to remove the mixer elements, the sleeves 88 can be moved downwardly, as in Figure 7, against the action of the springs 90 for allowing the balls 94 to move upwardly so that the shafts 70 can be removed from the sleeves 78.

When replacing the mixer elements, the sleeves 88 are also slid downwardly, so that the portion of the shaft 70 above the annular groove 72 can pass by the balls 94 and when the sleeves are released, the springs will move them upwardly to cause the inclined shoulders 96 to force the balls into the grooves 72 (as in Figure 6).

When it is desirable to set up the mixer for a fruit juicing operation, the parts 104, 110 and 100 are placed in the position of Figure 5, whereupon operation of the motor 50 will cause the reamer 110 to rotate. Fruit such as oranges and the like can then be cut in half and held by hand over the reamer 110 and the juice thereby being reamed therefrom will flow out through the spout 114.

During food mixing operations, food works up the shaft 70, and we have provided a means to return such food to the mixing bowl. This means consists of a flange 71 on each shaft. When the food works up to the flange, it is thrown off by centrifugal force and will return by gravity to the bowl as indicated by the arrow c in Figure 1.

Some changes may be made in the arrangement and construction of the various parts of our food mixer and fruit juice extractor, without departing from the real spirit and purpose of our invention, and it is our intention to cover by our claims, any modified forms of structure or use of mechanical equivalents, which may be reasonably included therein.

We claim as our invention:

1. In a device of the class described, a base, a bowl supported thereon, a motor support extending upwardly from said base and overhanging said bowl, a motor pivotally mounted on said motor support on an axis off-center relative to the axis of said bowl, and a mixer element depending from and operatively connected with said motor for cooperation with the contents of said bowl and pin and socket means to position said motor at a plurality of different angular positions relative to a plane containing the axis of said bowl and said first-mentioned pin.

2. In a device of the class described, a base, a bowl supported thereon, a motor support extending upwardly from said base and overhanging said bowl, a motor pivotally mounted on said motor support on an axis off-center relative to the axis of said bowl, and a mixer element depending from and operatively connected with said motor for cooperation with the contents of said bowl, the pivotal mounting for said motor comprising a member having a socket and a pin for coaction therewith, said pin having a shoulder, a retractible latch carried by said member, means normally causing said latch to prevent disconnection of said pin from said member by engagement of said shoulder with said latch, and additional pin and socket means to position said motor at a plurality of different angular positions relative to a plane containing the axis of said bowl and said first-mentioned pin.

3. In a food mixer and fruit juice extractor, a base, a bowl supported thereon, a motor support on said base, a motor removably positioned on said motor support, a mixing element carried by and operatively connected with said motor, a handle for supporting said motor and mixing element by hand when removed from said motor support, a fruit juice extractor mechanism associable with said motor, said handle being pivoted to said motor for movement to an out-of-theway position, said fruit juice extractor mechanism being adapted to be used with said motor when said handle is in such position, a spring urging said handle in one direction of its pivotal movement, and a latch to latch it in normal position against such urging.

4. In a device of the class described, a base, a bowl support thereon, a mixer element support on said base, a mixer element mounting and a mixer element depending therefrom for cooperation with the contents of a bowl mounted on said bowl support, said mounting being pivotally associated with said mixer element support for positioning at the center of said bowl support or spaced from the center thereof and means on said mixer element support cooperating with said mounting to confine said mounting to either one of said positions and against pivotal movement relative to said mixer element support.

5. In a device of the class described, a base, a bowl support thereon, a mixer element support on said base, a mixer element mounting and a mixer element depending therefrom for cooperation with the contents of a bowl mounted on said bowl support, said mounting having a depending pin, said mixer element support having a socket to receive said pin, said pin having a depression, a retractable latch carried by said mixer element support to normally coact with said depression and an auxiliary connection between said mounting and said mixer element support comprising a pin having a pair of circumferentially spaced sockets radially spaced from the axis of said first pin, said second pin being selectively coactable with either of said sockets.

WILLIAM B. KOCHNER.
EUGENE NEWNHAM.